(12) United States Patent
Yonushonis et al.

(10) Patent No.: US 7,393,386 B2
(45) Date of Patent: Jul. 1, 2008

(54) EXHAUST AFTERTREATMENT FILTER WITH RESIDUAL STRESS CONTROL

(75) Inventors: Thomas M. Yonushonis, Columbus, IN (US); Tao You, Madison, WI (US); Matthew P. Henrichsen, Apple Valley, MN (US); Rentong Wang, Columbus, IN (US)

(73) Assignee: Fleetguard, Inc., Nashville, TN (US)

( * ) Notice: Subject to any disclaimer, the term of this patent is extended or adjusted under 35 U.S.C. 154(b) by 539 days.

(21) Appl. No.: 11/138,834

(22) Filed: May 26, 2005

(65) Prior Publication Data

US 2006/0070357 A1 Apr. 6, 2006

Related U.S. Application Data

(60) Provisional application No. 60/616,470, filed on Oct. 6, 2004.

(51) Int. Cl.
*B01D 46/00* (2006.01)
*F01N 3/022* (2006.01)

(52) U.S. Cl. .................. 95/278; 95/273; 55/282.2; 55/282.3; 55/385.3; 55/502; 55/511; 55/513; 55/523; 55/DIG. 5; 55/DIG. 10; 55/DIG. 30; 60/295; 60/297; 60/299; 60/311; 428/116

(58) Field of Classification Search .............. 55/282.2, 55/282.3, 283, 385.3, 502, 511, 513, 523, 55/524, DIG. 5, DIG. 10, DIG. 30; 60/295, 60/297, 299, 303, 311; 428/116, 117, 118, 428/629, 630, DIG. 48; 29/890, 515
See application file for complete search history.

(56) References Cited

U.S. PATENT DOCUMENTS

| | | | |
|---|---|---|---|
| 4,017,347 A | 4/1977 | Cleveland | |
| 4,093,423 A * | 6/1978 | Neumann | 60/299 |
| 4,148,120 A * | 4/1979 | Siebels | 29/890 |
| 4,504,294 A * | 3/1985 | Brighton | 55/523 |
| 4,652,286 A | 3/1987 | Kusuda et al. | |
| 4,818,497 A * | 4/1989 | Andersson et al. | 55/513 |
| 4,960,449 A | 10/1990 | Yonushonis | |
| 5,014,509 A | 5/1991 | Broering et al. | |
| 5,052,178 A | 10/1991 | Clerc et al. | |
| 5,063,736 A | 11/1991 | Hough et al. | |
| 5,082,479 A | 1/1992 | Miller | |
| 5,320,909 A | 6/1994 | Scharman et al. | |
| 5,322,537 A | 6/1994 | Nakamura et al. | |
| 5,376,341 A * | 12/1994 | Gulati | 585/DIG. 30 |
| 5,409,669 A | 4/1995 | Smith et al. | |
| 5,620,490 A | 4/1997 | Kawamura | |
| 6,242,071 B1 * | 6/2001 | Yamada et al. | 428/116 |
| 6,245,301 B1 * | 6/2001 | Stroom et al. | 422/179 |
| 6,379,407 B1 | 4/2002 | Blackwell et al. | |

(Continued)

FOREIGN PATENT DOCUMENTS

CH 562 396 * 5/1975

*Primary Examiner*—Jason M. Greene
(74) *Attorney, Agent, or Firm*—Andrus, Sceales, Starke & Sawall, LLP; J. Bruce Schelkopf

(57) ABSTRACT

An exhaust aftertreatment filter has a pre-stressed layer bonded to the filter body at the outer periphery and compressively axially pre-stressed in an opposite axial direction to separational axial tensile stress to counteract the latter during regenerative heating, to minimize separational fracture and cracking.

30 Claims, 1 Drawing Sheet

U.S. PATENT DOCUMENTS

| | | |
|---|---|---|
| 6,540,816 B2 | 4/2003 | Allie et al. |
| 6,544,310 B2 | 4/2003 | Badeau et al. |
| 6,568,078 B2 * | 5/2003 | Eisenstock .................. 29/890 |
| 6,776,815 B2 | 8/2004 | Kato et al. |
| 2001/0036427 A1 * | 11/2001 | Yamada et al. .............. 422/179 |

\* cited by examiner

EXHAUST AFTERTREATMENT FILTER WITH RESIDUAL STRESS CONTROL

CROSS-REFERENCE TO RELATED APPLICATION

This application claims the benefit of and priority from Provisional U.S. Patent Application No. 60/616,470, filed Oct. 6, 2004, incorporated herein by reference.

BACKGROUND AND SUMMARY

The invention relates to exhaust aftertreatment filters for filtering exhaust from internal combustion engines, including diesel engines.

Exhaust aftertreatment filters for diesel engines are known in the prior art. The filter traps contaminant particulate in the exhaust. The filter is composed of regenerable material which is regenerated by heat to burn-off the trapped contaminant particulate. The filter includes a filter body, e.g. ceramic such as cordierite, having an outer periphery surrounding a central core. The outer periphery and the central core are subject to differential thermal expansion during thermal cycling during regeneration, due to the outer periphery being cooler than the central core. The differential thermal expansion subjects the filter body to separational axial tensile stress which in turn subjects the filter body to separational fracture and cracking.

The present invention addresses and solves the noted separational fracture and cracking problem in a simple and effective manner.

DETAILED DESCRIPTION

Figure 1:
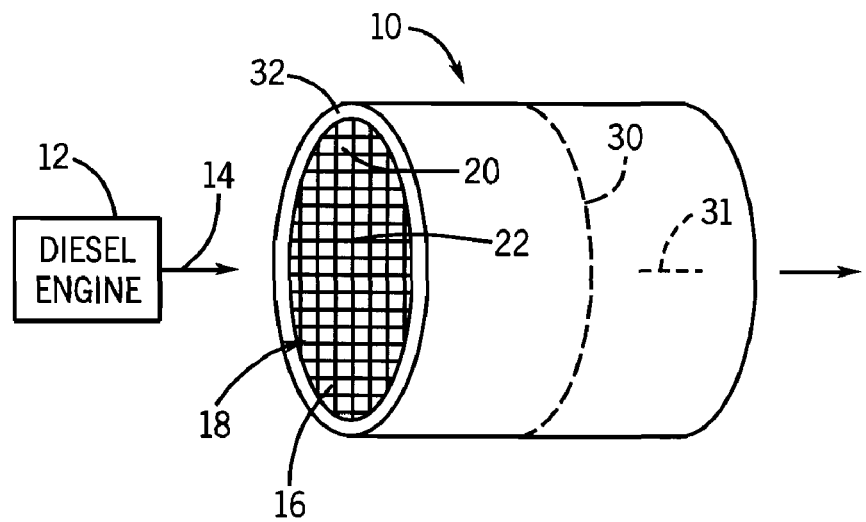
FIG. 1 is a perspective view of an exhaust aftertreatment filter in accordance with the invention.
Figure 2:
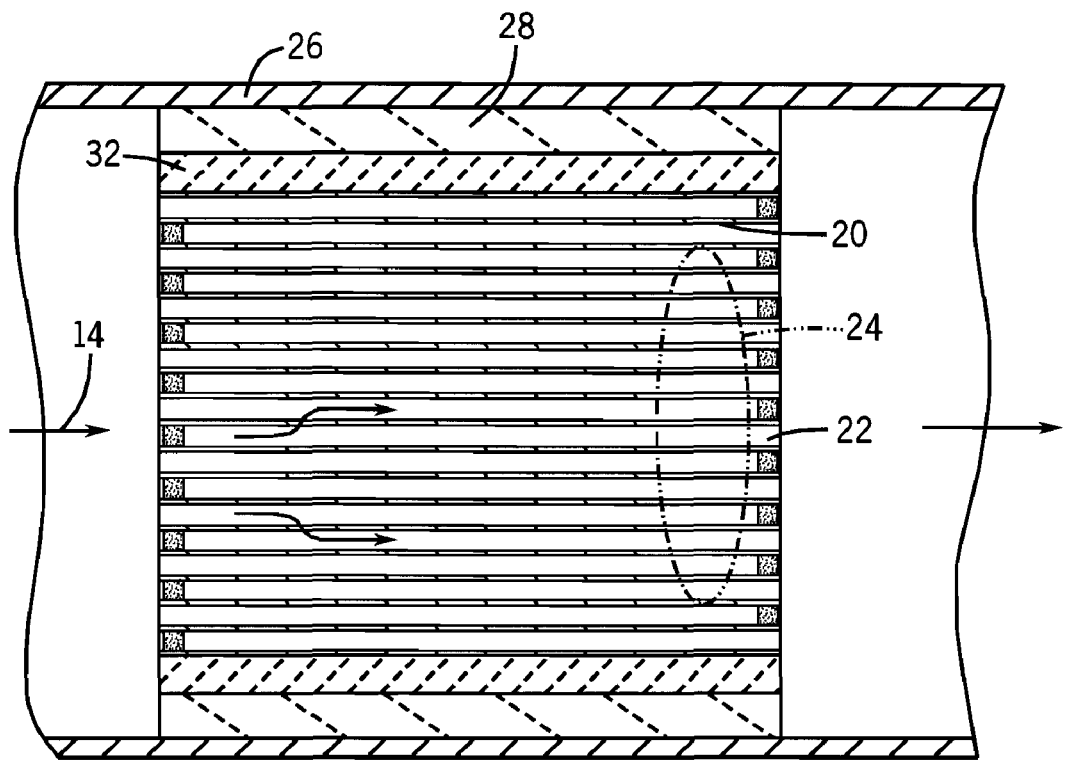
FIG. 2 is a sectional view of the exhaust aftertreatment filter of FIG. 1.

FIG. 1 shows an exhaust aftertreatment filter 10 for filtering exhaust from an internal combustion engine, such as diesel engine 12, flowing along an axial flow direction 14. The filter is composed of regenerable material 16, as known in the prior art, for example ceramic such as a cordierite honeycomb, regenerated by heat to burn-off trapped contaminant particulate from the engine exhaust. Contaminant particulate such as soot is trapped and accumulates in the filter, which trapped contaminant particulate is burned-off during regeneration. The filter includes a filter body 18 having an outer periphery 20 surrounding a central core 22. Outer periphery 20 and central core 22 are subject to differential thermal expansion during thermal cycling during regeneration, due to outer periphery 20 being cooler than central core 22. For example, FIG. 2 shows central hot spot 24, which is hotter than outer periphery 20, and which may be more dominant at the downstream side of the filter where particulate contaminant may accumulate and clog. With or without clogging or a downstream hot spot such as 24, outer periphery 20 runs cooler than central core 22, all as is known. The filter is typically mounted in a housing 26, such as a stainless steel canister, having a mat mounting material 28 surrounding the filter body and performing a number of functions including thermal resistance, dampening of vibration, and resistance to movement. The mat material is typically compressed between housing 26 and filter body 18.

The noted differential thermal expansion between hotter central core 22 and cooler outer periphery 20 subjects the filter body to separational axial tensile stress in the axial direction which in turn subjects the filter body to separational fracture and cracking, for example as shown at fracture or crack line 30 in FIG. 1. It is known by catalyst and filter manufacturers that the radial compressive stress applied by pressure obtained from an expanding mat material 28 assists in reducing the fracture probability of filter body 18. However, the radial compressive stress reduces the probability of fracture along a fracture line parallel to axis 31 of the filter perpendicular to crack line 30), and does little to prevent fractures along a fracture or crack line such as 30. Furthermore, the mat material can degrade over time, resulting in loss of pressure. With larger and heavier filters and longer lifetimes, particularly for diesel particulate filters in wall-flow application versus automotive flow-through catalyst application, the noted pressure and compressive stress applied by mat material 28 will decrease more rapidly, particularly than that observed for automotive catalysts. Furthermore, an automotive catalyst can still function after cracking because of its flow-through application, whereas a contaminant particulate filter loses effectiveness if cracked because of the bypass flow path created.

In the present disclosure, a pre-stressed layer 32 is bonded to filter body 18 at outer periphery 20 and is compressively axially pre-stressed in the opposite axial direction to the noted separational axial tensile stress to counteract the latter during regenerative heating. Pre-stressed layer 32 is pre-shrunk around other periphery 20 and has anti-separational axial compressive stress opposing the noted separational axial tensile stress. Pre-stressed layer 32 is thermally bonded to filter body 18 at outer periphery 20 at a thermal bonding temperature preferably, but not necessarily, greater than the regeneration temperature. In one embodiment, layer 32 is a coating, to be described, fired at a temperature, e.g. greater than 1,000° C. substantially greater than the noted regeneration temperature, e.g. 400° C. Layer 32 thus fuses with and becomes part of the filter body.

The noted pre-stressing of layer 32 is preferably accomplished by providing layer 32 as a material of greater coefficient of thermal expansion than filter body 18, such that pre-stressed layer 32 undergoes greater thermal contraction than filter body 18 upon cooling below the noted thermal bonding temperature, to provide pre-stressed layer 32 with the noted anti-separational axial compressive stress in the noted opposite axial direction to the noted separational axial tensile stress of filter body 18 due to the noted differential thermal expansion between central core 22 and outer periphery 20. The anti-separational axial compressive stress of pre-stressed layer 32 bonded to filter body 18 applies a compressive axial force to filter body 18 opposing the separational axial tensile stress. Pre-stressed layer 32 is further preferably formed of a material having a greater axial strength than the material of filter body 18. The greater axial strength of the material of pre-stressed layer 32 supports and withstands the noted anti-separational axial compressive stress upon the noted greater thermal contraction of pre-stressed layer 32.

Filter body 18 at outer periphery 20 cycles between first and second temperatures during the noted thermal cycling during regeneration, e.g. between 200° C. and 400° C. The first temperature, e.g. 200° C., is less than the second temperature, e.g. 400° C. The second temperature, e.g. 400° C., is less than the noted thermal bonding temperature, e.g. 1,000° C. At the noted first temperature, pre-stressed layer 32 is in axial tension and filter body 18 at outer periphery 20 is in axial compression. At the noted second temperature, pre-stressed layer 32 is in axial tension, and filter body 18 at outer periphery 20 is in axial compression or at least is in axial tension less than the axial tension of pre-stressed layer 32 at the noted second temperature.

In a preferred embodiment, pre-stressed layer 32 is a coating containing fibers. The coating includes a coating cement mixed with material selected from the group consisting of glass, alumina, silicon carbide, mullite, and fiber materials. The material of filter body 18 is ceramic, and the noted thermal bonding temperature, i.e. the temperature at which coating 32 is fired, is greater than the melting temperature of the noted coating cement.

Pre-stressed layer 32 bonded to filter body 18 at outer periphery 20 is compressively axially pre-stressed in an opposite axial direction to the noted separational axial tensile stress in filter body 18 to counteract the latter during regenerative heating. Pre-stressed layer 32 has anti-separational axial compressive stress opposing the noted separational axial tensile stress. Pre-stressed layer 32 is formed of a material having a greater axial strength than the material of filter body 18 and is thermally bonded thereto to prevent axial slippage therebetween at regeneration temperatures, e.g. 200°-400° C., such that the anti-separational axial compressive stress of pre-stressed layer 32 applies a compressive axial force to filter body 18 opposing the noted separational axial tensile stress. As above noted, pre-stressed layer 32 has a greater coefficient of thermal expansion than filter body 18 and is thermally bonded to the filter body at outer periphery 20 at a thermal bonding temperature greater than the regeneration temperature, whereby pre-stressed layer 32 undergoes greater thermal contraction than filter body 18 upon cooling below the noted thermal bonding temperature, e.g. 1,000° C., to provide pre-stressed layer 32 with the noted anti-separational axial compressive stress in the noted opposite axial direction. The greater axial strength of the material of pre-stressed layer 32 supports and withstands the noted anti-separational axial compressive stress upon the noted greater thermal contraction of pre-stressed layer 32.

In the preferred methodology, pre-stressed layer 32 is bonded to filter body 18 such that pre-stressed layer 32 is compressively axially pre-stressed in the noted opposite axial direction to the noted separational axial tensile stress to counteract the latter during regenerative heating, i.e. to counteract the axial tensile stress otherwise causing fracture or cracking as at 30 due to differential thermal expansion between hotter central core 22 and cooler outer periphery 20 during thermal cycling during regeneration. The method pre-shrinks layer 32 around outer periphery 20 such that layer 32 is pre-stressed and has the noted anti-separational axial compressive stress opposing the noted separational axial tensile stress. With coating or skin 32, the axial length of the high stress region is shorter and the magnitude of such stress is less, than without such coating or skin.

In the prior art, it is common to regenerate the filter at low levels of particulate contaminants, such as carbon collected on the filter walls, rather than waiting for higher levels of carbon, to avoid melting or the above noted fracture and cracking. Fracture is minimized by controlling thermal gradients causing the above-noted differential thermal expansion between central core 22 and outer periphery 20. By regenerating before such gradient gets too high, the chances of fracture can be lessened. However, even with acceptable controls, filter fracture can occur due to the low strength of filter materials including cordierite. Repeated cycles eventually weaken the structure and result in cracking of the filter. A particularly desirable feature of the present disclosure is that it increases the stress limit of ring crack failure and thus prolongs the life of the filter.

A skin which reduces tensile axial stress in filter body 18 at outer periphery 20 may be provided in various ways. The skin may be pre-stressed via pre-shrinking. The stress is developed by having a skin with a higher CTE (coefficient of thermal expansion) than the filter body. The stress is relaxed at high temperature (e.g. above operating temperature). Stresses are developed in the skin as the skin and body cool down because the skin is restrained from contracting by the filter body it surrounds. In other alternatives, the stress is developed by having a skin which shrinks through sintering after initial placement on the filter body. Skin CTE may be similar to that of the filter body or higher. Typically sintering temperature should be well above the filter regeneration temperature. Alternatively, any sintering arrangement which prevents sintering or stress relaxation at regeneration temperatures would be effective, e.g. a transient liquid phase would allow sintering only initially, or a sintering atmosphere. In another alternative, the stress is developed by having a skin which shrinks during curing. Skin CTE may be similar to that of the filter body or lower if curing takes place below regeneration temperatures. If curing takes place above regeneration temperatures, then skin CTE should be the same or higher than that of the filter body. In another alternative, the skin is pre-stressed via pre-loading. One approach is to use a room temperature setting cement with a ceramic fiber mesh embedded therein. When the cement skin is applied, the mesh is loaded axially. After the cement has cured, the load is removed, putting the fiber mesh in axial tension, and the cement and the filter body in axial compression. In another alternative, a skin may be used which is not initially pre-stressed, but which develops a stress at regeneration temperatures due to a lower thermal expansion than the filter body, which skin is thus pre-stressed for the next operation. The skin is applied and cured below the regeneration temperature. Stress may be transferred to the body from the skin by a thermal bond/diffusion bond, or by a chemical bond (e.g. aluminum phosphate bonds), or by a physical bond such as friction or interference.

It is recognized that various equivalents, alternatives and modifications are possible within the scope of the appended claims.

What is claimed is:

1. An exhaust aftertreatment filter for filtering engine exhaust flowing along an axial flow direction, said filter being composed of regenerable material regenerated by heat to burn-off trapped contaminant particulate from said engine exhaust, said filter comprising a filter body having an outer periphery surrounding a central core, said outer periphery and said central core being subject to differential thermal expansion during thermal cycling during regeneration, due to said outer periphery being cooler than said central core, said differential thermal expansion subjecting said filter body to separational axial tensile stress in said axial direction which in turn subjects said filter body to separational fracture and cracking, and comprising a pre-stressed layer bonded to said filter body at said outer periphery and compressively axially pre-stressed in an opposite axial direction to said separational axial tensile stress to counteract the latter during regenerative heating.

2. The exhaust aftertreatment filter according to claim 1 wherein said pre-stressed layer is pre-shrunk around said outer periphery and has anti-separational axial compressive stress opposing said separational axial tensile stress.

3. The exhaust aftertreatment filter according to claim 2 wherein said pre-stressed layer is thermally bonded to said filter body at said outer periphery at a thermal bonding temperature.

4. The exhaust aftertreatment filter according to claim 3 wherein said pre-stressed layer has a greater coefficient of thermal expansion than said filter body, such that said pre-stressed layer undergoes greater thermal contraction than said filter body upon cooling below said thermal bonding temperature to provide said pre-stressed layer with said anti-separational axial compressive stress in said opposite axial direction.

5. The exhaust aftertreatment filter according to claim 4 wherein said anti-separational axial compressive stress of said pre-stressed layer bonded to said filter body applies a compressive axial force to said filter body opposing said separational axial tensile stress.

6. The exhaust aftertreatment filter according to claim 5 wherein said pre-stressed layer is formed of a material having a greater axial strength than the material of said filter body.

7. The exhaust aftertreatment filter according to claim 6 wherein said filter body at said outer periphery cycles between first and second temperatures during said thermal cycling, said first temperature being less than said second temperature, said second temperature being less than said thermal bonding temperature, wherein:
at said first temperature, said pre-stressed layer is in axial tension;
at said first temperature, said filter body at said outer periphery is in axial compression;
at said second temperature, said pre-stressed layer is in axial tension; at said second temperature, said filter body at said outer periphery is in axial compression.

8. The exhaust aftertreatment filter according to claim 6 wherein said filter body at said outer periphery cycles between first and second temperatures during said thermal cycling, said first temperature being less than said second temperature, said second temperature being less than said thermal bonding temperature, wherein:
at said first temperature, said pre-stressed layer is in axial tension;
at said first temperature, said filter body at said outer periphery is in axial compression;
at said second temperature, said pre-stressed layer is in axial tension;
at said second temperature, said filter body at said outer periphery is in axial tension less than said axial tension of said pre-stressed layer at said second temperature.

9. The exhaust aftertreatment filter according to claim 6 wherein said pre-stressed layer is a coating containing fibers.

10. The exhaust aftertreatment filter according to claim 6 wherein said pre-stressed layer comprises coating cement mixed with material selected from the group consisting of glass, alumina, silicon carbide, mullite, and fiber materials.

11. The exhaust aftertreatment filter according to claim 10 wherein said material of said filter body is ceramic, and said thermal bonding temperature is greater than the melting temperature of said coating cement.

12. The exhaust aftertreatment filter according to claim 3 wherein said thermal bonding temperature is greater than the regeneration temperature.

13. The exhaust aftertreatment filter according to claim 1 wherein said pre-stressed layer has a greater coefficient of thermal expansion than said filter body, such that said pre-stressed layer undergoes greater thermal contraction than said filter body upon cooling to provide said pre-stressed layer with said anti-separational axial compressive stress in said opposite axial direction such that said pre-stressed layer applies a compressive axial force to said filter body opposing said separational axial tensile stress.

14. An exhaust aftertreatment filter for filtering engine exhaust flowing along an axial flow direction, said filter being composed of regenerable material regenerated by heat to burn-off trapped contaminant particulate from said engine exhaust, said filter comprising a filter body having an outer periphery surrounding a central core, said outer periphery and said central core being subject to differential thermal expansion during thermal cycling during regeneration, due to said outer periphery being cooler than said central core, said differential thermal expansion subjecting said filter body to separational axial tensile stress in said axial direction which in turn subjects said filter body to separational fracture and cracking, and comprising a pre-stressed layer bonded to said filter body at said outer periphery and compressively axially pre-stressed in an opposite axial direction to said separational axial tensile stress to counteract the latter during regenerative heating, wherein said pre-stressed layer has anti-separational axial compressive stress opposing said separational axial tensile stress, said pre-stressed layer being formed of a material having a greater axial strength than the material of said filter body and bonded thereto to prevent axial slippage therebetween at regeneration temperature such that said anti-separational axial compressive stress of said pre-stressed layer applies a compressive axial force to said filter body opposing said separational axial tensile stress.

15. The exhaust aftertreatment filter according to claim 14 wherein said pre-stressed layer has a greater coefficient of thermal expansion than said filter body.

16. The exhaust aftertreatment filter according to claim 15 wherein said pre-stressed layer is thermally bonded to said filter body at said outer periphery at a thermal bonding temperature greater than the regeneration temperature, and wherein said pre-stressed layer undergoes greater thermal contraction than said filter body upon cooling below said thermal bonding temperature to provide said pre-stressed layer with said anti-separational axial compressive stress in said opposite axial direction, said greater axial strength of said material of said pre-stressed layer supporting and withstanding said anti-separational axial compressive stress upon said greater thermal contraction of said pre-stressed layer.

17. The exhaust aftertreatment filter according to claim 15 wherein said filter body at said outer periphery cycles between first and second temperatures during said thermal cycling, said first temperature being less than said second temperature, wherein:
at said first temperature, said pre-stressed layer is in axial tension;
at said first temperature, said filter body at said outer periphery is in axial compression;
at said second temperature, said pre-stressed layer is in axial tension;
at said second temperature, said filter body at said outer periphery is in axial compression.

18. The exhaust aftertreatment filter according to claim 15 wherein said filter body at said outer periphery cycles between first and second temperatures during said thermal cycling, said first temperature being less than said second temperature, wherein:
at said first temperature, said pre-stressed layer is in axial tension;
at said first temperature, said filter body at said outer periphery is in axial compression;
at said second temperature, said pre-stressed layer is in axial tension;

at said second temperature, said filter body at said outer periphery is in axial tension less than said axial tension of said pre-stressed layer at said second temperature.

19. A method for making an exhaust aftertreatment filter for filtering engine exhaust flowing along an axial flow direction, comprising providing a filter composed of regenerable material regenerated by heat to burn-off trapped contaminant particulate from said engine exhaust, providing said filter with a filter body having an outer periphery surrounding a central core, said outer periphery and said central core being subject to differential thermal expansion during thermal cycling during regeneration, due to said outer periphery being cooler than said central core, said differential thermal expansion subjecting said filter body to separational axial tensile stress in said axial direction which in turn subjects said filter body to separational fracture and cracking, and providing a pre-stressed layer and bonding said pre-stressed layer to said filter body at said outer periphery such that said pre-stressed layer is compressively axially pre-stressed in an opposite axial direction to said separational axial tensile stress to counteract the latter during regenerative heating.

20. The method according to claim 19 comprising pre-shrinking said pre-stressed layer around said outer periphery such that said pre-stressed layer has anti-separational axial compressive stress opposing said separational axial tensile stress.

21. The method according to claim 20 comprising thermally bonding said pre-stressed layer to said filter body at said outer periphery at a thermal bonding temperature.

22. The method according to claim 20 comprising providing said pre-stressed layer of a greater coefficient of thermal expansion than said filter body, and, after said thermal bonding, cooling said pre-stressed layer and said filter body below said thermal bonding temperature such that said pre-stressed layer undergoes greater thermal contraction than said filter body, to provide said pre-stressed layer with said anti-separational axial compressive stress in said opposite axial direction.

23. The method according to claim 22 comprising applying a compressive axial force to said filter body with said anti-separational axial compressive stress of said pre-stressed layer thermally bonded to said filter body, said compressive axial force opposing said separational axial tensile stress.

24. The method according to claim 23 comprising providing said pre-stressed layer of a material having a greater axial strength than the material of said filter body.

25. The method according to claim 24 wherein said filter body at said outer periphery cycles between first and second temperatures during said thermal cycling, said first temperature being less than said second temperature, said second temperature being less than said thermal bonding temperature, wherein:
    at said first temperature, said pre-stressed layer is in axial tension;
    at said first temperature, said filter body at said outer periphery is in axial compression;
    at said second temperature, said pre-stressed layer is in axial tension;
    at said second temperature, said filter body at said outer periphery is in axial compression.

26. The method according to claim 24 wherein said filter body at said outer periphery cycles between first and second temperatures during said thermal cycling, said first temperature being less than said second temperature, said second temperature being less than said thermal bonding temperature, wherein:
    at said first temperature, said pre-stressed layer is in axial tension;
    at said first temperature, said filter body at said outer periphery is in axial compression;
    at said second temperature, said pre-stressed layer is in axial tension;
    at said second temperature, said filter body at said outer periphery is in axial tension less than said axial tension of said pre-stressed layer at said second temperature.

27. The method according to claim 24 wherein said pre-stressed layer is a coating containing fibers.

28. The method according to claim 24 wherein said pre-stressed layer comprises coating cement mixed with material selected from the group consisting of glass, alumina, silicon carbide, mullite, and fiber materials.

29. The method according to claim 28 wherein said material of said filter body is ceramic, and said thermal bonding temperature is greater than the melting temperature of said coating cement.

30. The method according to claim 19 comprising providing said pre-stressed layer of a greater coefficient of thermal expansion than said filter body, such that upon cooling said pre-stressed layer undergoes greater thermal contraction than said filter body, to provide said pre-stressed layer with said anti-separational axial compressive stress in said-opposite axial direction.

* * * * *